July 30, 1957 H. OVERLACH ET AL 2,801,011
GRIPPING TRUCK

Filed Aug. 3, 1954 3 Sheets-Sheet 1

INVENTORS
Hans Overlach and
H. Petrovski
BY Michael S. Striker
agt.

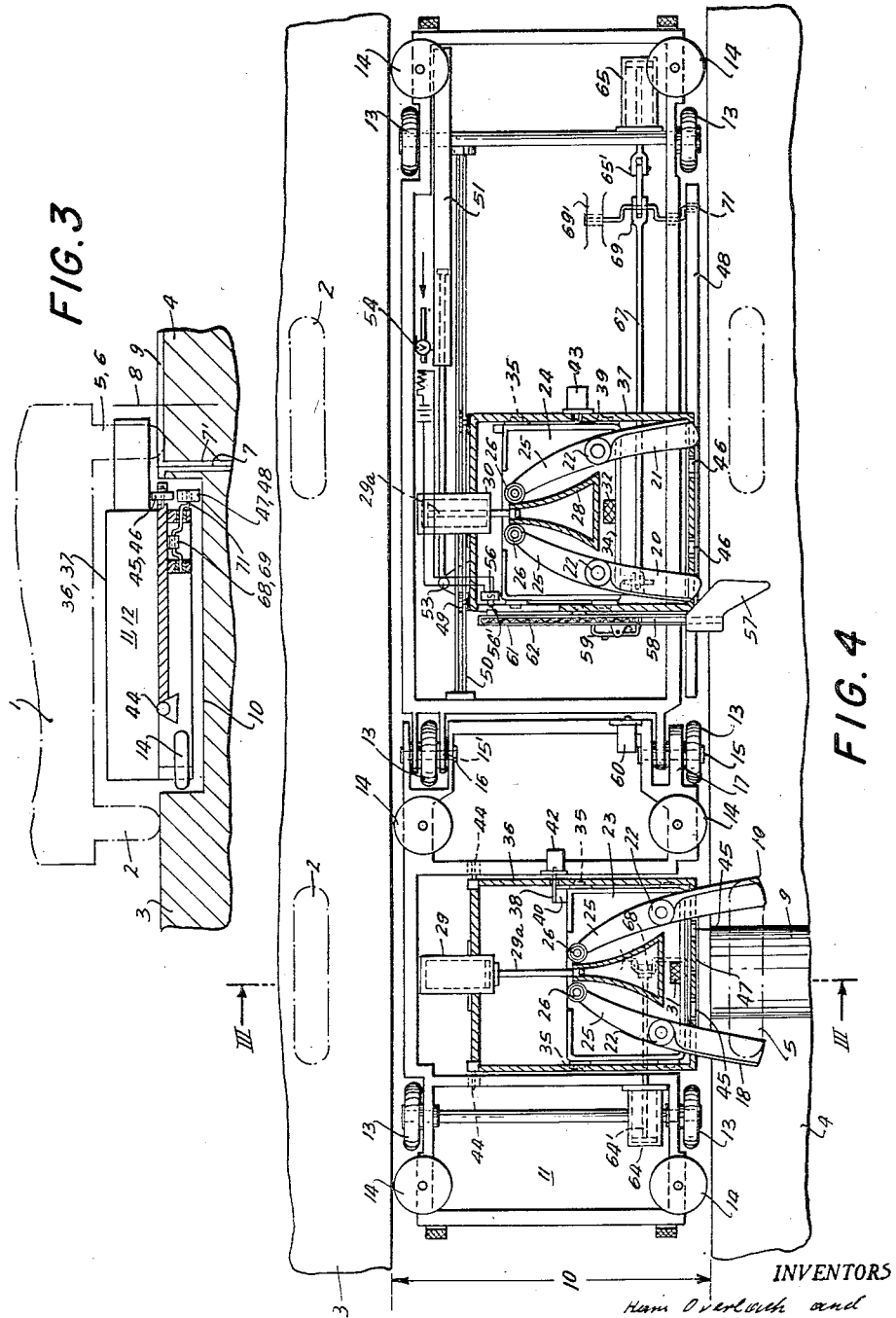

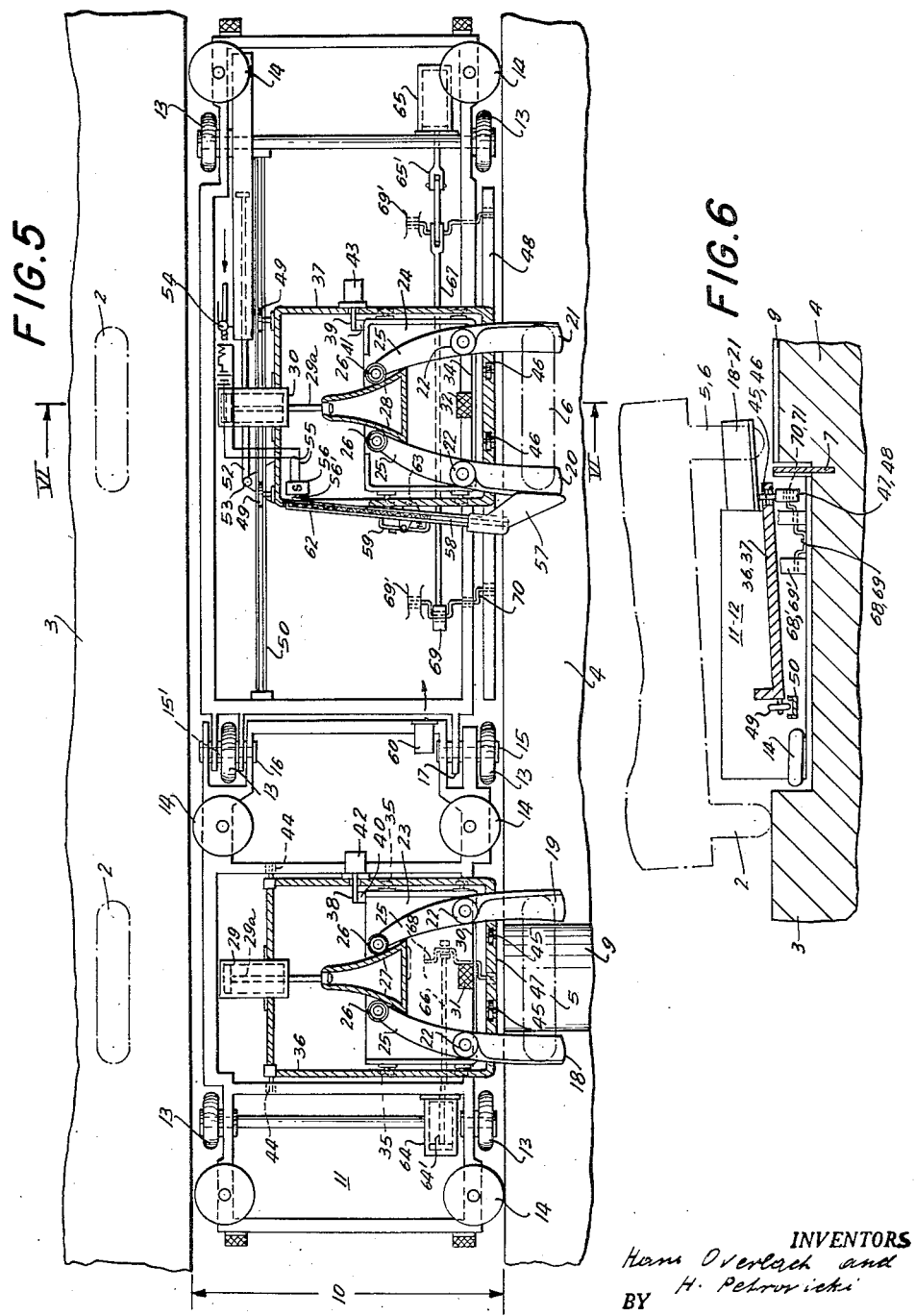

United States Patent Office 2,801,011
Patented July 30, 1957

2,801,011

GRIPPING TRUCK

Hans Overlach, Karlsruhe, and Herbert Petrovicki, Heidelberg, Germany

Application August 3, 1954, Serial No. 447,564

Claims priority, application Germany August 3, 1953

1 Claim. (Cl. 214—16.1)

Vehicle gripping trucks are known which run on rails and which cooperate with a stationary elevator, and serve to grip vehicles and push them on their own wheels into an elevator or after they have been lifted serve to push them out into a parking place. These vehicle gripping trucks grip the vehicle to be parked at the front end and require appropriate bumpers or fenders on the vehicle to avoid damage. In numerous small and medium sized vehicles, especially of European design and construction, such bumpers or fenders are not provided.

The invention solves the problem of parking small, medium or large vehicles in a comprehensive manner without the need for their having bumpers. Vehicle gripping trucks according to the invention are characterized by a box like shape in which account has been taken, in a transverse direction, of the ground clearance and, in transverse direction, the spacing of the wheels of the smallest vehicles and in a longitudinal direction, of the distance between front and rear wheels of the largest cars available. They are further characterized in that the means for carrying out the automatic gripping procedure are mounted in the box unit or frame so as to be capable of being pushed or swung outwardly.

Further features are that the vehicle gripping truck is guided by vertical and horizontal guiding rollers, and is formed of two or more main parts and various linkages in order to compensate for differences in height, misalignment or twist of the floor of a vertically travelling elevator cage with respect to that of the space.

Advantageous further features of the invention consist in the provision of a gripping device, which is immovable longitudinally of the truck, for engaging the front wheel when in position particularly defined by a transverse groove or the like in the floor, and a further gripping device for the rear wheel longitudinally adjustable in accordance with the varying wheel base length of different vehicles. Preferably both gripping devices include gripping members which can be moved laterally outwards from the truck, such members being arranged in pairs in operative connection with a device for automatically adjusting the gripping members to the various sizes of vehicle tires, for example by means of wedges with a variable inclination.

A further feature resides in a feeler member mounted on the gripping device for the rear wheel which is longitudinally movable in the box like truck, which feeler member is pushed outwardly of the box like truck, and upon movement of the gripping device is moved towards the rear wheel and after abutting against said wheel stops the movement of the gripping device and brings about the pushing out and closing of the gripping members on the rear wheel.

Further features consist in a device for the lifting of the gripped vehicle wheels as well as in an automatically operating control for the series of individual movements involved in engaging, displacing, and releasing the gripping members. Furthermore it is preferred to use pneumatic devices for the individual movements.

In the accompanying diagrammatic drawings a preferred embodiment of the invention is shown by way of example.

Figure 1:
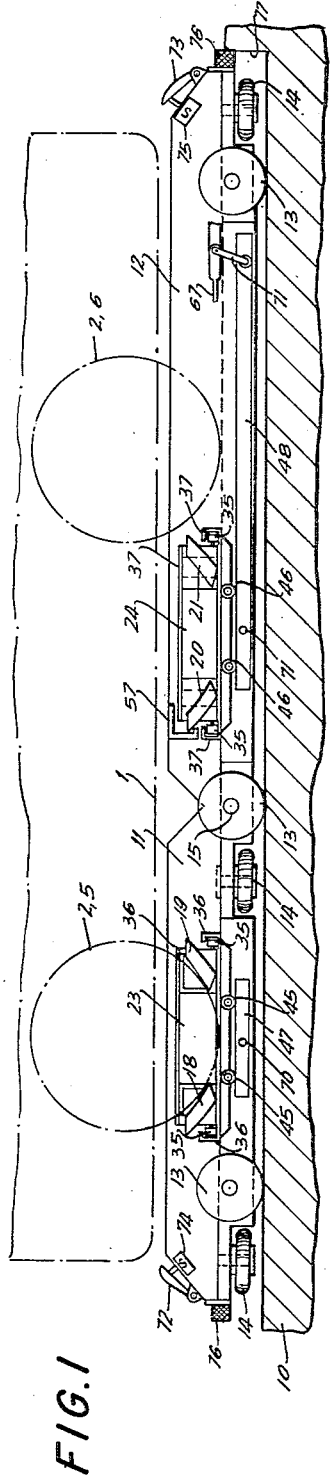
Figure 1 shows the vehicle gripping truck in side elevation.

Figure 3 shows the truck in diagrammatic cross section approximately along line III—III of Fig. 4 with the wheels of a vehicle set down, Figure 4 shows the truck in plan view with the stationary gripping members extended and with the protruding feeler lever on the movable gripping device, Figure 5 is a plan view of the truck with gripped and raised front and rear wheels of a vehicle, and Figure 6 is a diagrammatic sectional elevation approximately along line VI—VI of Fig. 5 of the truck with gripped and raised front and rear wheels.

In the drawings 1 indicates the vehicle to be parked whose wheels 2, not gripped by the gripping members, can run along the floor 3 of the compartment or elevator cage and are not laterally guided. The floor 4 on the other side of the vehicle 1 has in the drive-in compartment only two guiding rails 7, 8 which serve for the lateral guiding of the wheels 5, 6 to be gripped. The inner rail 7 is capable of being lowered, by conventional means, not shown, into a slot 7' in order not to interfere with the gripping process. An incoming vehicle 1 is driven under its own power into the drive-in compartment until one of its front wheels 5 stands in the transverse groove 9 provided in the floor 4 and the vehicle is then hereby located in the gripping position.

In the compartment and elevator cage recesses 10 are provided which serve to guide the gripping truck, which is effected by three pairs of vertical supporting rollers 13 and horizontal guiding rollers 14. The front part 11 and the trailer part 12 of the gripping truck are hingedly connected to tilt defined by a horizontal axis about the axles 15, 15' of the centre pair of rollers 13 in order to compensate for differences in height between the floor of the elevator cage and that of the compartment. Misalignment or twist of the floor of the compartment with respect to that of the elevator cage are taken care of by a universally flexible bearing bushing 16 of axle 15' which preferably consists of an elastic material such as rubber and permits the two parts 11, 12 of the gripping truck to make small tilting movement in the transverse direction, or small twists by allowing the link 17 to have a little play with respect to its axle 15. The shovel-like gripping members 18, 19 for the front wheel 5, or 20, 21 for the rear wheel 6 are mounted on pivots 22 in carriages 23, 24 which are movable transversely to the direction of movement of the gripping truck, and these members 18, 19 have at the inner ends of the lever arms 25 pressure rollers 26 which run on divergent cam tracks. These divergent cam tracks 27, 28 are moved in and out by the piston rods 29a of the cylinders 29, 30. When moving outwards the cam tracks 27, 28 abut against the walls 33, 34 of the carriages 23, 24 being stopped by buffer members 31, 32. The carriages 23, 24 run on wheels 35 or in sliding tracks in the trough-like frames 36 and 37 and are also pushed forward by the piston rods 29a through a bracket (not shown) extending downward from the piston rod and engaging the rear wall of carriage 23 and 24, respectively, on the forward stroke, until the spring loaded locking bars 38, 39, after sliding along the adjacent wall of carriage 23, 24, respectively, engage behind the catch 40, 41 on the carriage 23, 24, respectively, so as to hold these carriages in their forward position until the actuation of the unlocking magnets 42, 43, after the parking of the vehicle permits them to be moved back again. The frame member 36 is pivotally mounted in the first part 11 of the gripping truck, so that it can be tilted upwardly about the axis of pivot pins 44 in the interior of the truck for raising the gripping members. The frame 36 is supported intermediately between the gripping members 18, 19 by rollers 45 supported by rails 47 the function of which will be described further below.

The frame 37 in the second part 12 of the gripping truck is movable longitudinally of the gripping truck, with the gripping members 20, 21 mounted therein. Inside the truck the frame 37 is supported at one end by rollers 49 which run in guides 50. At the opposite end, on the side of the gripping members 20, 21, it runs by means of supporting rollers 46 on rails 48, which, for lifting the gripping members, allows the whole frame 37 to be pivoted upwardly about the supporting points of the rollers 49 in the guides 50. The longitudinal movement is effected by a hydraulic or pneumatic cylinder 51, whose piston 52 is fixed to base of the frame 37 at 53. The hydraulic or pneumatic pressure medium operating the piston during a movement of frame 37 is cut off for stopping this movement by means of the valve 54 operated, for example electrically, through the leads 55 and the normally closed switch 56 whose spring-loaded actuator 56' abuts against the rear end of tube 62. The switching off of the longitudinal movement of the travelling frame 37 must be effected at a position where the centre of the frame is located opposite the centre of the wheel 6 to be gripped (Fig. 5). This position is controlled by means of a feeler lever 57 mounted above the gripping member 20. The feeler lever 57 having a guiding shank 58 slidable in the tubular member 62 is initially retained within the outline of the gripping truck by a spring-loaded catch 59 mounted on tube 62 and adapted to engage the shank 58. Upon actuation of the electromagnet 60, mounted in the truck and adapted to withdraw the catch 59 when energized by an operator, the lock 59 is released and frees the feeler 57, whereupon under the action of the spring 61 inside the tube 62 the shank 58 with the feeler lever 57 is pushed outwards into the region of the wheel 6 to be engaged. The tube 62 is pivotable horizontally through a certain angle about a pivot 63 in the adjacent side wall of frame 37. Upon contacting the wheel 6 to be gripped the feeler 57 remains in contact with the wheel while the frame 37 is moved further. Thus a rotation of the feeler 57 and of its guide tube 62 takes place about pivot 63 (Fig. 5) whereby through pressure on the actuator 56' the switch 56 is opened and the longitudinal movement is stopped by closing valve 54. The frame 37 stops in position in front of the wheel 6 to be gripped, which is then embraced and gripped by the means controlled by cylinder 30, as the piston rod 29a pushes forward the cam 28, and the carriage 24 until the latter is locked in position by the locking bar 39 behind catch 41, whereafter the piston rod 29a withdraws the cam 28 and thereby causes the gripping members 20, 21 to grip the wheel 6. In the same manner the front wheel 5 is gripped by gripping members 18, 19 under action of corresponding parts 29, 29a, 40, 38 and 27.

When all the gripping members are pressed against the tires of the front and rear wheels, the cylinders 64, 65 are charged with a pressure medium. The piston rods 64', 65' of these cylinders move by means of connecting rods 66, 67, respectively, the crank shafts 68, 69, rotatable in bearings 68', 69' on truck part 11, 12, respectively, and to raise the rails 47, 48 which are operatively engaged by the crank ends 70, 71, respectively, whereby the wheels 5 and 6 are lifted to a certain height above the groove 9 and floor 4, respectively.

At the end of the gripping truck (Fig. 1) spring flaps 72, 73 are mounted, which when a gripping truck is pushed under a vehicle 1 make contact with any downwardly hanging leads or members, or detect if the height of the vehicle above the floor is too low, e. g. due to flat tires. Upon closing of the switch 74, 75, respectively, by the pertaining flap the movement of the gripping truck is stopped by suitable conventional means adapted to be actuated by said switches.

In order to enable the position of the gripping truck to be exactly fixed with respect to the groove 9, buffers 76 preferably of rubber are provided at both ends which make it possible to drive the gripping truck free of damage right up to the end 77 of the recess 10.

The following describes by way of example how a vehicle is gripped and parked.

The vehicle 1 drives under its own power into the drive-in compartment (in Figs. 1 and 2 from right to left) as a result of which its left side wheels 5, 6 run on the floor 3, 4 between rails 7 and 8 until front wheel 5 arrives in the transverse groove 9, so that the exact position necessary for gripping the wheels has been reached. The driver then leaves the vehicle. The transporter tower with the elevator platform is then driven in front of the occupied drive-in compartment and the gripping truck 11, 12, is pushed, by the pushing apparatus provided in the elevator cage, into the recess 10 beneath the vehicle 1—from left to right in Figures 1 and 2, until the rubber buffer 76 abuts against the end 77 of the recess, whereby the exact position of the gripping truck with respect to the vehicle to be gripped or to the groove 9 is determined.

For enabling the gripping members 18—21 to engage the tires 5, 6 without interference, the inner guide rail 7 is lowered in its slot 7'. When the final position of the gripping truck is reached the operator, by pressing a button or actuating a lever initiates the series of automatic movements necessary to grip the wheels.

At this stage the cylinder 29, which may be, for example, actuated pneumatically, pushes the carriage 23 and cam 27 outwards by means of the piston rod 29a towards the buffer 31, until the catch 40 passes the locking bar 38 and engages it and the gripping members 18, 19 extend outwards beyond the outline of the gripping truck and embrace the front wheel 5 standing in the groove 9, at first without contacting it (Fig. 4). At the end of its stroke the piston rod 29a is reversed and now withdraws the cam 27 while the carriage 23 remains locked in its forward position. Upon this withdrawal of the cam 27 the rollers 26 with the levers 25 are urged outwards and press the gripping members 18, 19, rotating about their pivots 22, against the front wheel tire 5 (Fig. 5 left hand portion). If the tire diameter is large, as in the case of heavy vehicles, the gripping members engage more quickly, that is, the cam need not be withdrawn as far as is necessary in the case of tires of smaller diameter. This has as the result that in the first case, if for example a large tire is to be gripped between the members, the rollers 26 remain on the flatter portion of the curve of the cam 27 and thus produce a stronger clamping force than in the case of smaller tires where the rollers are on the steeper part of the cam curvature.

Figure 2:
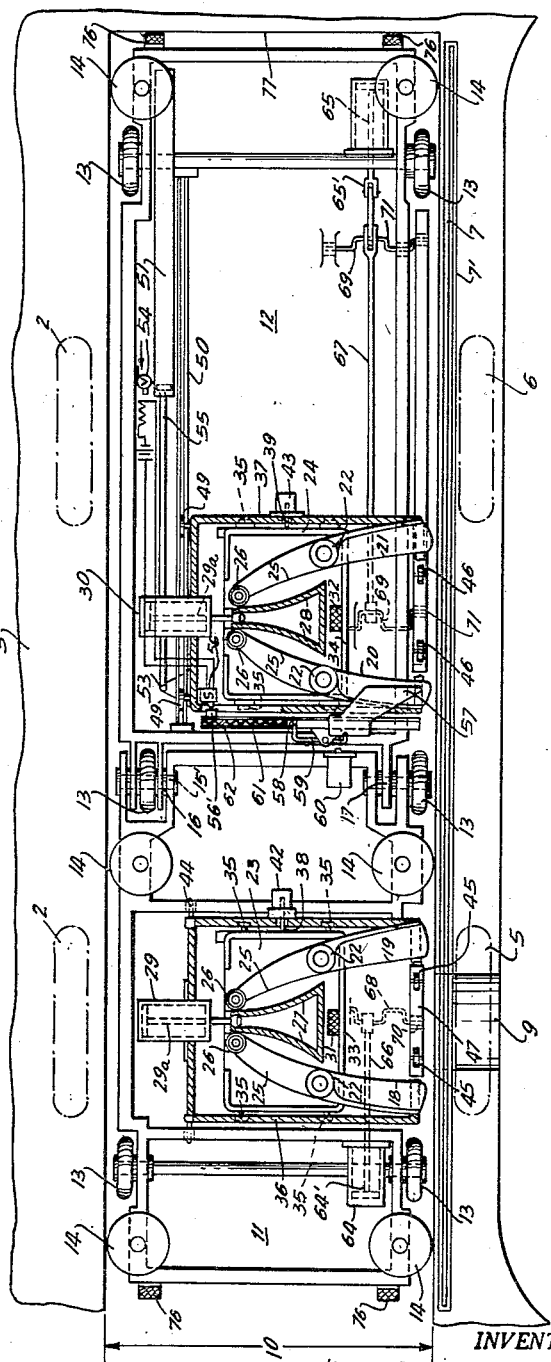
Figure 2 shows the truck in plan view with the gripping members withdrawn.

Simultaneously with the gripping of the first wheel, brought about by the operator's actuation of the control button or lever, with carriage 24 in the position shown in Fig. 2, magnet 60 pushing against catch 59 releases the latter so that the feeler lever 57 is pushed by spring 61 out of the side of the gripping truck (Fig. 4). Again simultaneously with this movement the cylinder 51 is set in operation via the valve 54. By means of the piston rod 52 engaging the frame 37 at 53 it moves the latter with the second gripping device 20, 21, in the direction of the arrow A, until the feeler lever 57 abuts against the wheel 6 to be gripped. Since the frame is still in motion, the feeler lever is rotated about the pivot 63 on the frame and thus actuates the switch 56 and via valve 54 stops the further supply of pressure medium to the cylinder 51, so that the frame now remains stationary in front of the second wheel 6 of the vehicle.

The switch 56 also through electrically operated pressure control means, not shown, but similar to valve 54 actuates the cylinder 30 which pushes the carriage 24 outwards until the catch 41 passes the locking bar 39 and engages it. The piston rod 29a of cylinder 30 is then reversed and draws the cam 28 back whereby the tire 6 is tightly gripped by the members 20, 21 (Fig. 5) with a strong or weak cam action depending on the size of the tires.

After withdrawal of cam 28, and the gripping of the rear wheel 6 the cylinders 64, 65 are simultaneously supplied with pressure fluid and by means of the rods 66, 67, crank shafts 68, 69, and the crank ends 70 and 71, respectively, raise the rails 47 and 48, and thus by means of rollers 45, 46 raise the frames 36 and 37 with the gripping members mounted therein and the wheels gripped thereby until a sufficient clearance between the wheels 5 and 6 and the floor 4 is obtained to enable the movement into the elevator to take place (Fig. 6).

The gripping truck 11, 12 is now drawn into the elevator with the wheels 2 of the vehicle 1 rolling on the floor 3 while being drawn or driven into the elevator. The elevator platform is then raised to the required floor while at the same time the transporter tower is moved to a position opposite the compartment in which the vehicle is to be parked.

After reaching the parking compartment the gripping truck is pushed into it until its buffer 76 abuts against the end 77 of the recess 10 and gives the vehicle the exact position for it to be parked or picked up again. After pushing the truck in, the pressure in the cylinders 64, 65 is released and the wheels 5 and 6 are thereby lowered, so that wheel 5 rests in groove 9 which is provided in each compartment so as to exactly fix the position of the vehicle to be parked. After lowering the wheels or after completion of the movement of pistons 64', 65' the cylinders 29, 30 simultaneously push the cams 27, 28, respectively, outwards until they abut against the front walls 33, 34 of the frames or the buffers 31, 32 the front walls still being in the forward position. Simultaneously with the operation of the cylinders 29, 30 the magnets 42, 43 are energised and therefore withdraw the locking bar 38, 39 from engagement with the catches 40, 41, respectively, so that upon withdrawal of the cams 27, 28 now the carriages 23, 24 are also withdrawn to the starting position. Upon this withdrawal, the feeler lever 57 with corresponding compression of spring 61 is also withdrawn by a catch (not shown) coupling the parts 57, 58 to the carriage 24, until it is again retained by its catch 59 in the starting position, i. e. inside the outline of the gripping truck. Since now all the gripping members and the feeler lever are withdrawn within the outline of the gripping truck, the gripping truck can be withdrawn into the elevator, although the frame 37 having been moved by cylinder 51 is still in the position removed from the first gripping device 18, 19 according to the wheel base of the vehicle engaged.

During withdrawal of the gripping truck the piston rod 52 pushes the frame 37 back to the starting position (Fig. 2), whereupon the movement is stopped. With regard to the total time necessary for picking up a vehicle, time is gained in depositing the vehicle and the time required for returning the second frame 37 to its starting position is gained because this return movement takes place while the truck is withdrawn. The time gained serves to shorten the working cycle.

Having now fully described and ascertained our said invention and the manner in which it is to be performed, we declare that what we claim is:

A gripping truck for use in a vehicle parking system in which a vehicle is parked in a garage consisting of a plurality of compartments arranged side by side and on several floors with the aid of a horizontally movable transporter tower having a vertically movable elevator cage, said gripping truck, comprising, in combination, a box-like frame composed of at least two parts connected together for movement relative to each other about a horizontal axis so as to take up differences in height between the elevator cage and the compartment floor; first gripping means adapted to grip a front wheel of a vehicle and being mounted within said frame for movement outwardly of said frame in a direction transverse to the longitudinal axis of said gripping truck for gripping said front wheel; second gripping means adapted to grip a rear wheel of the vehicle and being mounted within said frame for movement outwardly of said frame in said transverse direction and also for movement relative thereto in the direction of said longitudinal axis of said gripping truck; feeler means adapted to engage said rear wheel and to be pushed out from the side of said frame in said transverse direction and to be moved until it contacts said rear wheel, said feeler means being carried by said second gripping means for movement therewith in said longitudinal direction; and moving means operatively associated with both of said gripping means and said feeler means in such a manner that after said gripping truck has been placed beneath the vehicle, said first gripping means is moved outwardly of said frame for gripping said front wheel and said feeler means is simultaneously moved outwardly of said frame whereupon said second gripping means, together with said feeler means, is moved in said longitudinal direction until said feeler means contacts said rear wheel whereupon said second gripping means is moved outwardly of said frame for gripping said rear wheel, and also in such a manner that after said gripping means have gripped their respective wheels, both of said gripping means are raised so as to permit movement of said gripping truck together with the vehicle.

References Cited in the file of this patent

UNITED STATES PATENTS

| | | |
|---|---|---|
| 1,584,517 | Dinkelberg | May 11, 1926 |
| 1,891,795 | Buettell | Dec. 20, 1932 |
| 2,016,662 | Aitken | Oct. 8, 1935 |
| 2,629,507 | Olson | Feb. 24, 1953 |
| 2,656,940 | Sumners et al. | Oct. 27, 1953 |

FOREIGN PATENTS

| | | |
|---|---|---|
| 623,360 | Germany | Dec. 19, 1935 |